United States Patent
Smith

(10) Patent No.: US 9,037,278 B2
(45) Date of Patent: May 19, 2015

(54) SYSTEM AND METHOD OF PREDICTING USER AUDIO FILE PREFERENCES

(71) Applicant: Jeffrey Scott Smith, Incline Village, NV (US)

(72) Inventor: Jeffrey Scott Smith, Incline Village, NV (US)

(*) Notice: Subject to any disclaimer, the term of this patent is extended or adjusted under 35 U.S.C. 154(b) by 326 days.

(21) Appl. No.: 13/798,005

(22) Filed: Mar. 12, 2013

(65) Prior Publication Data

US 2014/0277638 A1   Sep. 18, 2014

(51) Int. Cl.
  *G06F 17/00*   (2006.01)
  *G06F 17/30*   (2006.01)

(52) U.S. Cl.
  CPC .... *G06F 17/30743* (2013.01); *G06F 17/30775* (2013.01)

(58) Field of Classification Search
  CPC ............. G06F 17/30017; G06F 17/30743; G06F 17/3002; G06F 17/30023; G06F 17/30026; G06F 17/30029
  See application file for complete search history.

(56) References Cited

U.S. PATENT DOCUMENTS

| | | | |
|---|---|---|---|
| 5,616,876 A | 4/1997 | Cluts | |
| 5,712,953 A | 1/1998 | Langs | |
| 5,918,223 A | 6/1999 | Blum et al. | |
| 6,545,209 B1 | 4/2003 | Flannery et al. | |
| 6,678,680 B1 | 1/2004 | Woo | |
| 7,003,515 B1 | 2/2006 | Glaser et al. | |
| 7,232,948 B2 | 6/2007 | Zhang | |
| 8,326,584 B1* | 12/2012 | Wells et al. | 703/2 |

* cited by examiner

*Primary Examiner* — Andrew C Flanders
(74) *Attorney, Agent, or Firm* — Stephen E. Zweig

(57) ABSTRACT

A computerized method of automatically determining a user's potential liking for an unknown audio file, based upon a reference audio file that the user likes. Each audio file is analyzed into various frequency and amplitude bins, each bin having a time length that is at least a substantial fraction of the audio file's normal playing time. Each bin is further scored according to the complexity or information content of the audio signal in that bin. Corresponding bins from the reference audio file and one or more unknown audio files are then compared on a per-bin basis, and the results aggregated according to an anticipated user affinity score using an anticipated user affinity algorithm. The method can be used by an internet server to accept song input from users (using user computerized devices), and in turn suggest other high user affinity score songs that the user may like.

20 Claims, 6 Drawing Sheets

SYSTEM AND METHOD OF PREDICTING USER AUDIO FILE PREFERENCES

BACKGROUND OF THE INVENTION

1. Field of the Invention

This invention is in the field of computerized audio signal analysis and automated music preference determination.

2. Description of the Related Art

Music is known and loved throughout the world, and many advances in modern technology have, at least in part, been inspired by a desire to record music, and distribute recorded music to various individuals and groups.

Individual tastes in music of course vary widely, and as a result, the process of determining in advance which particular musical efforts an individual or group might like has traditionally been a rather uncertain business, usually requiring artistic human judgment.

Music is commonly classified by genre, artist, album title and song title. One common method of finding new music of potential interest is to use genre and artist type classification. For example, an individual who likes a known artist or group can use this knowledge to add to his or her collection of recordings from that artist or group. This method is less useful for finding other types of music, however. Music genres, although better than nothing, are not overly helpful, because they are usually too broad. As a result, the genre classification usually includes so many different artists as to be of marginal use in finding new specific songs or other recordings that match a particular individual's preferences.

Previous efforts to provide automated methods for music preference determination include U.S. Pat. No. 5,616,876 by Cuts, and U.S. Pat. No. 6,545,209 by Flannery et. al. This earlier work was based on a human based rating system, however.

As the Internet has proliferated, various Internet commerce and ecommerce sites have come to provide various types of music recommendations. These recommendations are generally based on other user's preferences, i.e., "people who bought music A also bought music B" type logic. This user recommendation methodology, although again better than nothing, has the drawback that it perpetuates the purchase of more common titles, and overlooks more obscure music which might have actually fitted a given individual's particular musical tastes better. Another drawback of prior art "other user recommendation" type methods is that these methods also require a significant amount of purchase history. This again tends to skew results towards older, more established, or more heavily marketed musical works.

Pandora Internet Radio has attempted to create a music classification process based on the "Music Genome Project" work of Glaser et. al., U.S. Pat. No. 7,003,515. In other documents, Pandora describes their method as: "our team of fifty musician-analysts has been listening to music, one song at a time, studying and collecting literally hundreds of musical details on every song. It takes 20-30 minutes per song to capture all of the little details that give each recording its magical sound—melody, harmony, instrumentation, rhythm, vocals, lyrics . . . and more-close to 400 attributes." Clearly this is a very labor intensive, time consuming and subjective method that at its heart is not dissimilar from other prior art human analysis methods.

Various proposals for various types of more fully computerized methods for characterizing music have also been proposed. These include U.S. Pat. No. 5,918,223 by Blum et al., and others. These patents often focus on automated methods to characterize audio files according to various acoustic signal aspects such as the mean, standard deviation, autocorrelation and first derivative of at least one of the acoustical features of loudness, pitch, brightness, bandwidth, and MFCC coefficients.

Other patents in this type of computerized music rating art include U.S. Pat. No. 6,678,680 by Woo; 7,232,948 by Zhang; 5,712,953 by Langs; and others.

Despite this prior art, there are still no satisfactory automated music suggestion methods that are presently on the market. Thus further advances in this field would be useful.

Note that these methods should be distinguished from computerized efforts to identify various forms of the same music audio file, which are often used by copyright holders to detect unwanted copying. Such file identification methods are useless for identifying entirely different audio files that the user may like, but which otherwise are in no way copies of a song that the user may have been previously familiar with.

BRIEF SUMMARY OF THE INVENTION

The invention is based, in part, on the insight that although of course music lyrics and instrumentation can be important factors in determining which songs or other music are liked and disliked, behind these surface aspects of music, there may be a hidden layer of like and dislike based on the overall information content or information complexity (complexity) carried by the music at various frequency ranges and amplitude ranges throughout most or all of a particular music audio file of interest.

To illustrate this insight, consider the following examples:

1: A lover of loud heavy metal rock music may value music where, throughout most of the music, much of the information in the music is carried by high amplitude and low frequency sound waves, and other information in the music is carried in the audio frequency range of the human voice by high amplitude sound waves.

2: A lover of choral music may value music where most of the information is carried, throughout a large portion of the music, at the frequencies of the human voice, but at a more moderate amplitude.

3: A lover of chamber music may more highly value music where, throughout most of the music, most of the information in the music is carried over a broader range of frequencies and at lower amplitudes, relative to examples 1 and 2 above.

4: A lover of symphonies may prefer music where, throughout most of the music, most of the information is carried over a very broad range of frequencies and a very broad range of amplitudes (e.g. from a base drum to a triangle or piccolo).

Even within songs of the same genre, there are characteristic differences according to this scheme. A rock music lover looking for something akin to the classic "Stairway to heaven" may be attracted to similar songs that have a similar mixture of low intensity high complexity in the human vocal range (i.e. the opening of the song), and a mixture of high intensity high complexity music across many frequencies (i.e. the later parts of the song).

This type of analysis, which is extremely complex and must be done by a computer, generally requires that a music audio file be first divided into different audio frequency and audio amplitude bins, and then, throughout at least a substantial portion of the audio file's playing time, the complexity or information content of the audio sounds at a particular bin's frequency range and audio amplitude range be analyzed. Here the complexity, i.e. how complex the sounds in that particular bin are, can be considered to be related to how complex the sound wave forms are. Thus for example, a simple sine wave at a given frequency and amplitude will not take many bits of information to reproduce, and this would thus have low complexity. By contrast, the waveforms of a human voice, which is a very complex waveform, would require many bits of information to reproduce and this would thus have higher complexity.

The invention is also based on the insight that given a particular music audio file that a given individual is known to like (e.g. known high user affinity audio file), and a variety of other music audio files where the user liking is unknown (e.g. unknown user affinity audio files), such complexity comparison methods can also be used to estimate or rank how similar the one or more unknown user affinity audio files are to the at least one known high user affinity audio file. This in turn can be used in various automated systems to recommend music to the user, or even automatically select music for the user.

Note that in an important contrast to prior art music analysis methods, which often break the music audio file into many small time segments (often on the order of a second or less), and analyze each time segment individually, the present invention is less concerned about this sort of fine detail level time analysis. That is in some embodiments, each audio frequency and amplitude bin may have a time dimension that is either the same time length as that of the normal playing time of the audio file, or else a substantial portion (e.g. 10% or greater) of the time length of the normal playing time of the audio file, such as ⅕, ⅓, or ½ of the audio file. Within at least the frequency, amplitude, and time duration of a particular bin, the complexity of the audio file (song) within that bin is thus often evaluated as a whole.

Thus in one embodiment, the invention may be a computerized method of comparing audio files according to anticipated user affinity (liking). Generally the method uses a computer processor, memory, and associated software to analyze a substantial portion of an audio file, and in the analysis divide the constituent waveforms of the audio file into a plurality of frequency and amplitude bins, each bin having a time duration comprising most or all of the playing time of the audio file, but each bin having its own audio frequency and audio amplitude ranges.

The method will then analyze, on a per-bin basis, the complexity of that portion of the audio files or signals in each bin according to at least one complexity algorithm, and produce a complexity score for each bin. The method will then further, based on at least one audio file that the user is known to like (high user affinity audio file), and at least one audio file where the user preferences are unknown (unknown user affinity audio file) produce at least one user affinity score between at least one high affinity audio file and at least one unknown affinity file. The system or user can then use this score to select or recommend music to the user.

This user affinity score can be computed by various methods. In one embodiment, the affinity score can be computed by selecting matching bins with the same corresponding frequency and amplitude, and using their respective complexity scores in anticipated user affinity algorithm, thus producing an anticipated user affinity score between any given known high affinity music audio file and any given unknown affinity music audio file.

DETAILED DESCRIPTION OF THE INVENTION

Figure 1:
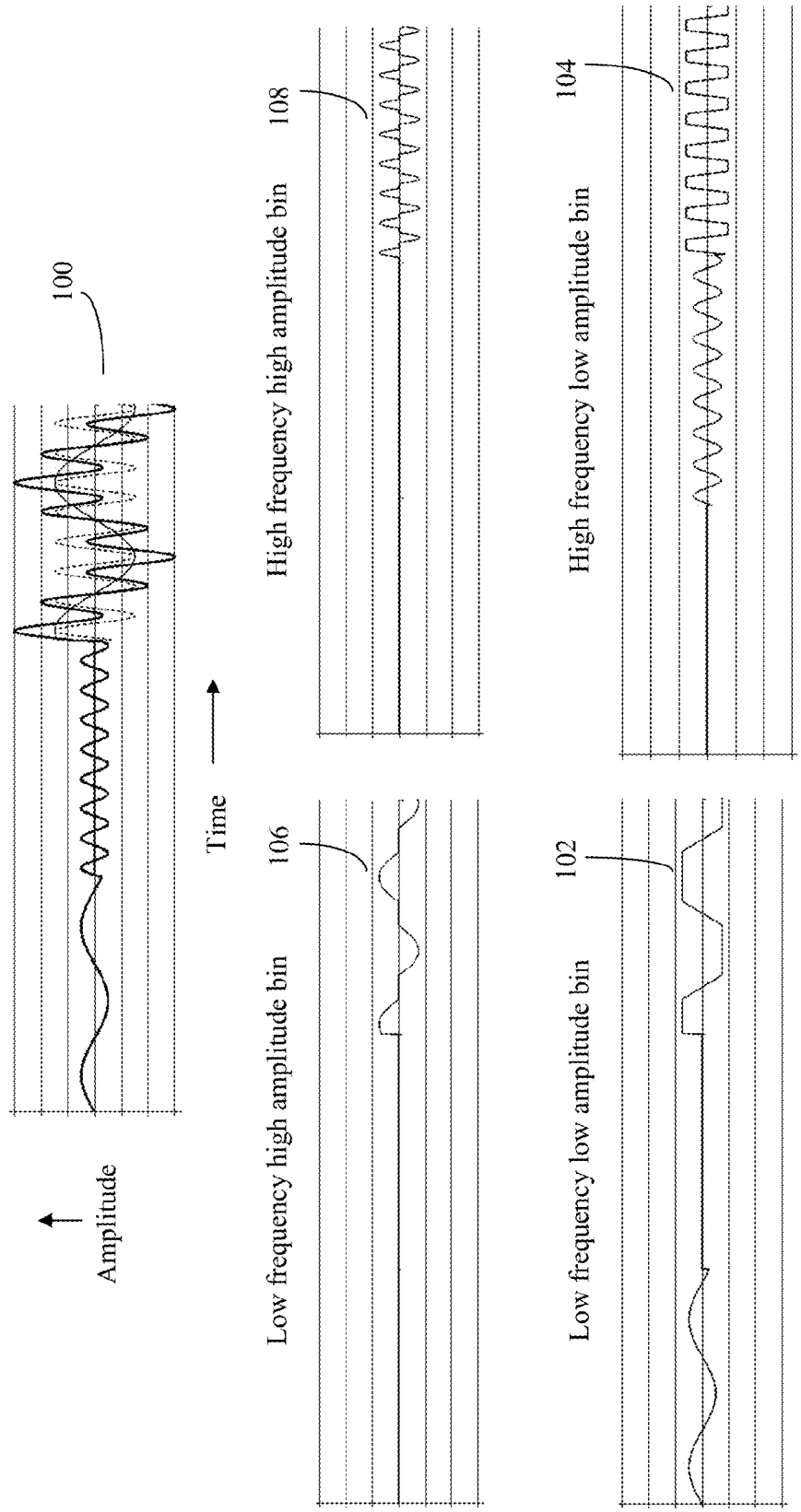
FIG. 1 shows an example of how an audio file may be binned according to various frequency and amplitude bins.

The present invention will generally operate with digital audio files, usually of music, usually stored in a computer readable format, such as an uncompressed audio format (e.g. an AIFF, AU, PCM or WAV format), a lossless compressed audio format (e.g. ATRAC, FLAC, m4a, MPEG-4, WMA Lossless or WavPack format), or a lossy compressed audio format (e.g. AAC, MP3, WMA lossy format) or other format.

These digital audio files will usually consist of at least one audio track (for mono sound), and often two audio tracks (e.g. stereo sound) or even more audio tracks (e.g. 5.1 surround sound). The digital audio file will normally have a defined playing time duration "t" when played at its nominal playback speed (i.e. the speed where the audio sounds most closely resemble the original audio source material).

According to the well known principles of Fourier analysis, even highly complex sounds, such as the sounds of an orchestra, or the human voice, and the like, can be represented as a sum of various sine waves or other complex exponential waves, each with its own frequency and amplitude. Although other mathematical methods of sound analysis methods may also be used for these purposes, in many of the examples discussed here, Fourier methods of sound analysis have been used for many of the binning examples due to their underlying simplicity. Alternatively, band-pass cutoff filters (often digitally implemented) based methods may also be used.

The various audio files used according to the present invention will thus typically comprise at least one audio track, and generally each audio track can itself, according to Fourier analysis methods previously discussed, be considered to be composed of the sum or other summation function of a plurality of other constituent audio waveforms (e.g. sine waves or other complex wave functions), each audio waveform having at least its own frequency and amplitude.

Generally the frequency range of the various audio tracks used according to these methods will correspond to the frequency range of the human ear, which is often roughly between about 20 Hz to 20 kHz, as is standard for these various formats. The actual electronic sampling rate of the audio sounds may be different from this, and typically will be at least twice that of the basic frequency range, as per Nyquist frequency considerations.

The dynamic range of the various audio tracks will generally correspond to at least 8 bits of dynamic range (for very low quality music), 12 bit range, 16 bit range (CD quality), 24 bit range (e.g. DVD-Audio quality), and the like. Thus very low quality (primitive video game) music will generally have $2^8=256$ levels of sound amplitude, CDs will typically have $2^{16}$=65,536 levels of sound amplitude (about 90 dB), and DVD-Audio will generally have $2^{24}$=16,777,216 levels of sound amplitude. This later amplitude range corresponds roughly to the dynamic range between total silence and a sound level of 120-144 dB, similar to a jet engine at close range, which can cause ear damage, and thus is likely close to the physiological limits of the human ear.

The present invention will typically be implemented on at least one computer or computerized device, generally having at least one processor (often a microprocessor), memory, and software stored in memory as needed to implement the invention. Using the invention, users may indicate to the system which songs or other music that the user likes, with the goal of having the system in turn suggest or return other songs that the invention's methods suggest may also be pleasing to the user. To do this, the user may often interact with the system via a first computerized device (e.g. Smartphone, music player, tablet computer, laptop computer, desktop computer and the like), and communicate over a network, such as the internet, to one or more server computers. In at least some embodiments, these server computers can then perform the various analysis which will be discussed shortly. These sever computers may also access a database of other musical files, either directly (e.g. stored on the server) or indirectly (e.g. via a network connection from the server). Other computer implemented schemes may also be used.

In some embodiments, the invention may be a computerized method of comparing various audio files according to anticipated user affinity. As previously discussed, these various audio files will each have their own nominal playing time duration "t". They will be composed of at least one audio track (for mono audio files) and often two or more audio tracks (for stereo or surround sound, etc.). Each of these audio tracks on each of these audio files will generally be composed of audio sounds, usually represented in a digital computer readable format, and these sounds, according to the Fourier analysis methods previously discussed, can be considered to be composed of a sum of a plurality of simpler constituent audio waveforms, each with their own frequency, and amplitude.

As previously discussed, unlike most alternative computer analysis approaches, the present invention will generally analyze a substantial time portion of the musical audio file, and often even the entire audio file playing time, in order to better understand the impact of the music, as a whole, on the listener.

Generally the method will operate by using the computer processor, memory, and software to divide or analyze the various constituent waveforms of at least one audio track of the audio file (often more than one audio track may be so analyzed), and divide these waveforms into a plurality of frequency bins and amplitude bins. A simplified example of this process is shown in FIG. 1.

FIG. 1 shows an example of a short time playback from a simplified audio file. Here time is on the horizontal axis, and amplitude is on the vertical axis. This file consists of a mix of two tones, one tone being at a lower frequency, and another tone being at a higher frequency. The two tones first appear sequentially, first the lower tone at a lower amplitude, then the higher tone at a lower amplitude, and finally a mix of the two tones, each now occurring at an amplitude that is roughly 3× their initial amplitude (100).

In this simplified binning process, one bin may correspond to lower frequency, lower audio amplitude waveforms (102), a second bin may correspond to higher frequency, low amplitude waveforms (104), and so on. Similarly, a third bin (106) may correspond to lower frequency, higher amplitude waveforms, a fourth bin (108) to higher frequency, higher amplitude waveforms (108), and so on.

Note that in some embodiments, each bin will generally cover a time duration "t" corresponding to most or all of the time duration of that particular musical audio file. Thus for example, a low frequency low intensity sound from the beginning of the musical playback can in some embodiments be or weighted the same as a low frequency, low intensity sound from the end of the musical playback, and so on. The net effect is not unlike what happens in the user's brain after the entire musical piece has been played in full, and the user's brain is operating on the memory of the entire musical piece in order to form a subjective "like"/"not like" evaluation.

In other embodiments, as previously discussed, the bins may be divided into large time chunks, each a substantial portion of the original playing time of the file, such as 10%, 20%, 30%, 40%, 50% of the audio file time duration "t". In these embodiments, the beginning of the song or audio file may optionally be weighted in the analysis more heavily than the end of the song, or the beginning and end of the song be weighted more heavily than the middle, and so on. Here the basic idea is that if the user does not immediately like the unknown song, it might be better just to move on and suggest an alternate song.

After this binning the audio signal according to at least frequency and amplitude process, the invention will generally then characterize the overall complexity of the audio waveform data found in each bin.

There are many ways to analyze this complexity, and any and all ways are considered to be encompassed by the invention. One way to determine complexity is to use various algorithms to estimate the number of bits of data encoded in the waveforms in each bin. This can be done by, for example, attempting to compress the bin waveform data according to a lossy or lossless encoding scheme, and determining the length in bits of the resulting file, or by other methods. Alternatively information theory methods, including Claude E. Shannon's information theory entropy equations, can be used to determine the entropy or information content of the waveform information encoded in this bin. This information content may also be expressed, in at least some embodiments, on a numbers of bits basis or other measuring unit.

In some embodiments, only the positive or absolute values of the waveforms in the various bins may be used for the complexity analysis. In other embodiments, all amplitude values (positive, negative, and zero) of the waveforms in the various bins may be used for the complexity analysis. In other embodiments, only the non-zero values, and/or values where the slope of the waveform in the bin is not zero, may be used.

In the examples discussed here, however, a simple and fast computer complexity analysis method has been used in which for each bin, the complexity algorithm determines the complexity by determining (to various levels of approximation and accuracy depending upon the particular implementation) the length of the value of said each bin (e.g. the sum of the lengths of various waveform portions in each bin), as a function of the frequency in the bin, or as a function of the bin time, over the bin frequency range or time range. As a simple way to understand one version of this length measurement (assuming narrow frequency bins), if a piece of string was put on top of the waveform in that particular bin, the distance from the beginning to the end of that piece of string, when straightened out, would to some extent track the complexity or information content in that waveform in that bin. This is only an approximation, of course, and again other methods may be used, but this "distance" method is quite fast to implement.

Alternatively, the length measurement may only operate on those portions of the waveforms in each bin that have non-zero amplitude and/or have a non-zero slope (i.e. not credit the flat "clipped" portions of the waveforms that don't meet that bin's amplitude requirement towards the total length measurement).

Generally, because each frequency bin will encompass a range of frequencies (even if this is just a narrow frequency range), a range of amplitudes (even if this is just a narrow amplitude range) and each bin will have time duration of either "t" or a significant fraction of "t", the amplitude of the audio signals in each bin will more properly be represented by a surface, and the complexity of the audio signals in that bin may more properly be addressed by the surface area of that bin. However for simplicity, in this example let us assume that the frequency range of each bin is quite narrow, so that simply the mathematical length of the amplitude of the audio signals can be an adequate approximation for the complexity of the audio signal in that bin.

Figure 2:
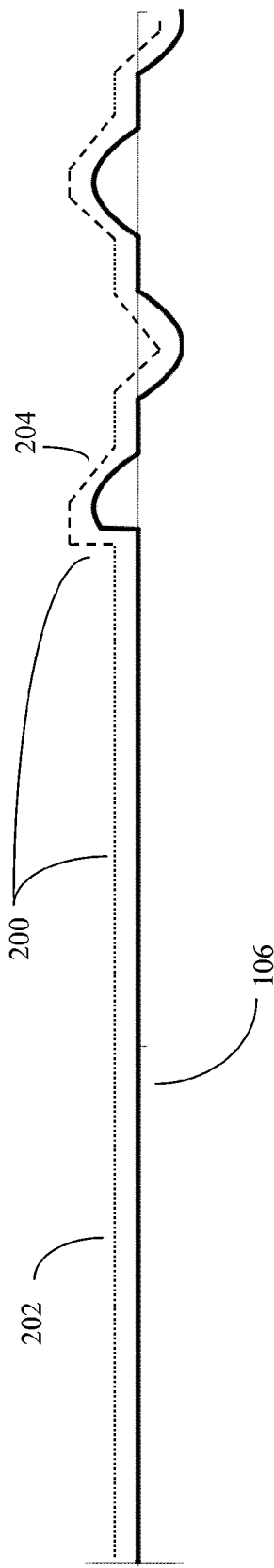
FIG. 2 shows one example of a fast method to at least roughly determine bin complexity. This quick method operates by calculating the length (or surface area) of the audio signals in a particular frequency and amplitude bin. Simpler signals will have smaller length or surface area, while more complex signals will have a correspondingly larger length or surface area.

An example of a very simple, fast, and efficient (in terms of computer time and resources) bin complexity algorithm in operation is shown in FIG. 2. In this figure, the low frequency higher amplitude bin (106) from FIG. 1 is shown magnified. Here the computer is at least approximately determining the "length" (or "distance") of the value of the audio signal in this bin literally by breaking the underlying audio signal into various constituent lines, and then summing up the length of the various lines (200). Clearly the more closely the analysis follows the actual signal, the better, but here the point is that an approximation of the true length (or area) is generally adequate for these purposes.

In order to get at least a decent approximation of length (or area) for music audio signals, often the complexity algorithm will determine the value of that particular bin's audio signal by analyzing the value of the line at time intervals that roughly correspond to at least the half wavelength of the frequency (or upper frequency if the bin has a wide frequency range) of that particular bin. This is because, according to Nyquist frequency analysis, and as can be seen in FIG. 2, this level of sampling frequency is generally required in order to at least roughly follow the signal, and hence estimate the length (or area) of the audio signal in this bin. Higher frequencies of sampling can, of course, also be used as desired.

Depending on the length or distance algorithm used, those portions of the value of those line segments that have zero amplitude and/or zero slope (small dots 202) may or may not be credited towards the length of that bin, while those portions that have non-zero amplitude and non-zero slope (dashes 204) generally will be credited towards the length of that bin.

Thus a typical bin from a typical time length audio song file may be sampled, for a distance or area type complexity analysis, 200,000 times or more depending on bin frequency and time length (playing time) of the song.

This set of per-bin audio complexity values (generated as previously described by analyzing an audio file into a plurality of frequency and amplitude bins, and then determining the complexity of each bin), may, further be processed into a "user affinity score". This user affinity score is intended to be a rating that estimates or predicts, based on at least one music audio file that a given user is known to like (e.g. a first high affinity audio file), what the user affinity or liking will likely be for at least a second and unknown affinity (liking) audio file.

To do this, in addition to analyzing the first high affinity audio file on a per-bin and bin complexity basis, the computerized method will also analyze at least one, and often many other, alternative audio files where the user liking or affinity is not known (unknown affinity audio files), and produce a complexity analysis of these alternative unknown affinity audio files on a per-bin complexity basis. Usually the binning scheme (e.g. division by frequency, division by amplitude/intensity) and the like will be (or should be) consistent among all audio files, at least among audio files of the same general musical type, so as to provide consistent comparisons.

As will be discussed, once this comparative complexity information is generated on a per-bin basis between the first high affinity audio file and one or more unknown audio affinity files, various algorithms may be used to create a final user affinity score.

There are a large number of different algorithms that may be used for this purpose (one particular example will be provided shortly). What these different algorithms will usually have in common is that often the user affinity algorithm that creates the user affinity score will generally operate by determining the similarities and differences in complexity values between sets of corresponding (matching) frequency and amplitude bins, as well as determining which frequency and amplitude matched bins have the highest or lowest complexity score. These similarities and differences will then generally be summed up or otherwise aggregated.

Generally these various computed bin comparison values, or a function of these various computed bin comparison values, will then be summed over all or at least a substantial portion of all of the various bins, and a user affinity score determined.

This user affinity score may then either be reported or used as is, or alternatively further processed or normalized. In some normalization schemes, for example, the score corresponding to 100% affinity (i.e. when the same audio file is analyzed versus itself) may be normalized to be a pre set number such as 100% or 1), while 0% affinity (when the same audio file is analyzed versus a completely silent audio file) may be normalized to give a value of 0% or 0, and so on.

Various techniques may be used to construct the various frequency and amplitude bins. In some embodiments it can be useful to distribute these bins (i.e. set the low and high frequency, low amplitude and high amplitude boundaries of each bin) so that the bins are roughly equally important—i.e. empty bins that almost always correspond to unused frequencies or audio intensity are of little use in this method.

Put alternatively, at least one audio characteristic or audio characteristic function of the binned audio signal should be distributed relatively evenly between the various bins. It is also generally important and useful to use the binning thresholds or criteria (e.g. frequency and amplitude boundaries) the same between the various audio files that are being analyzed. However other binning schemes may also be used as desired.

In order to compute an anticipated user affinity score, various types of anticipated user affinity algorithms may be used. Generally these algorithms will operate by comparing the information content or complexity of equivalent bins (e.g. equivalent frequency ranges and amplitudes) between the known high affinity audio file, and one or more unknown affinity files. Generally differences in complexity scores, similarities in complexity scores, highest and lowest complexity scores will be determined and then summed or integrated over the plurality of bins according to various functions and various algorithms. In some schemes, the various bins may be further sub-binned according to their complexity scores, thus effectively creating a three dimensional array of frequency, amplitude, and complexity bins. These in turn may be evaluated by various anticipated user affinity algorithms as discussed above.

Although in some embodiments, the complexity values in all the bins may be compared between the known high affinity audio file and the unknown affinity audio file(s), in other schemes, only a subset of these bins may be so compared and used to compute an anticipated user affinity score. In still other schemes, a preliminary comparison may be done with a relatively small subset of the bins to winnow down a larger number of unknown affinity audio files to a smaller number of unknown affinity audio files, and then these smaller number of pre-selected and potentially promising unknown affinity audio files can be further compared in more detail using a larger number of bins.

Because often an individual will form an immediate impression as to if they like or dislike a song or other audio file after only a few seconds of listening, in some embodiments, and as previously discussed, the bins may also be separated according to time "t", and those bins occurring near the beginning of the audio file may, for example, be given a higher weight. Generally such time weighting methods will be more useful for short time duration audio files, such as popular songs, and will be less important for longer duration audio files such as symphonies.

In some embodiments, the invention's system and method may be used to rank a plurality of audio files in a computer database, thus allowing a user of the database to use indicia (i.e. if the audio file is a song, the song's name, a link to the song file, clicking on a picture of the song, and so on) of at least one high affinity audio file as a database query.

In this system, the computer database can use these methods to scan the database and return other indicia (e.g. if system recommended audio file is a song, the name of a suggested song, a picture of the suggested song, a link to the suggested song, etc.) of at least one unknown affinity audio file that may be potentially acceptable to said user. Alternatively the system may transmit or play this at least one unknown affinity audio file to the user or the user's computerized device.

Figure 3:
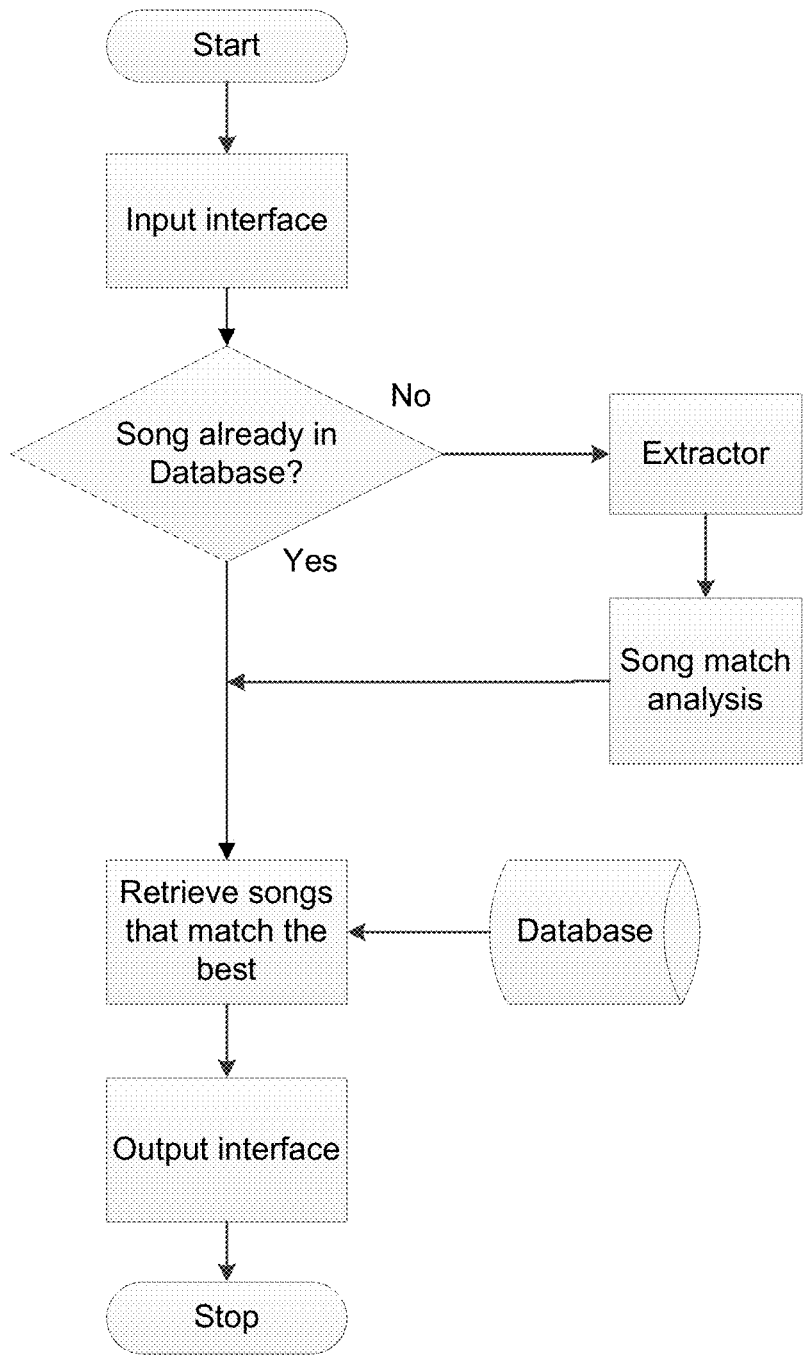
FIG. 3 shows an overall flow diagram of how the invention's methods may be used in a computerized song audio file evaluation analysis.

FIG. 3 shows an overview of a computerized song recommendation system which can be used in accordance with one embodiment of the present invention. This figure, as well as all the other figures, will of course generally be implemented by software running on the computer processor. The system will generally include a user input that allows the user to input a known liked audio file (song). The system can also determine if a copy of the song has already been processed by the system, and determine if the resulting attributes, data and matches have been generated. If so, of course, then nothing further need be done. Assuming that the song has been previously analyzed, then the system will retrieve songs that most similarly match with the song that was loaded to the system.

Figure 4:
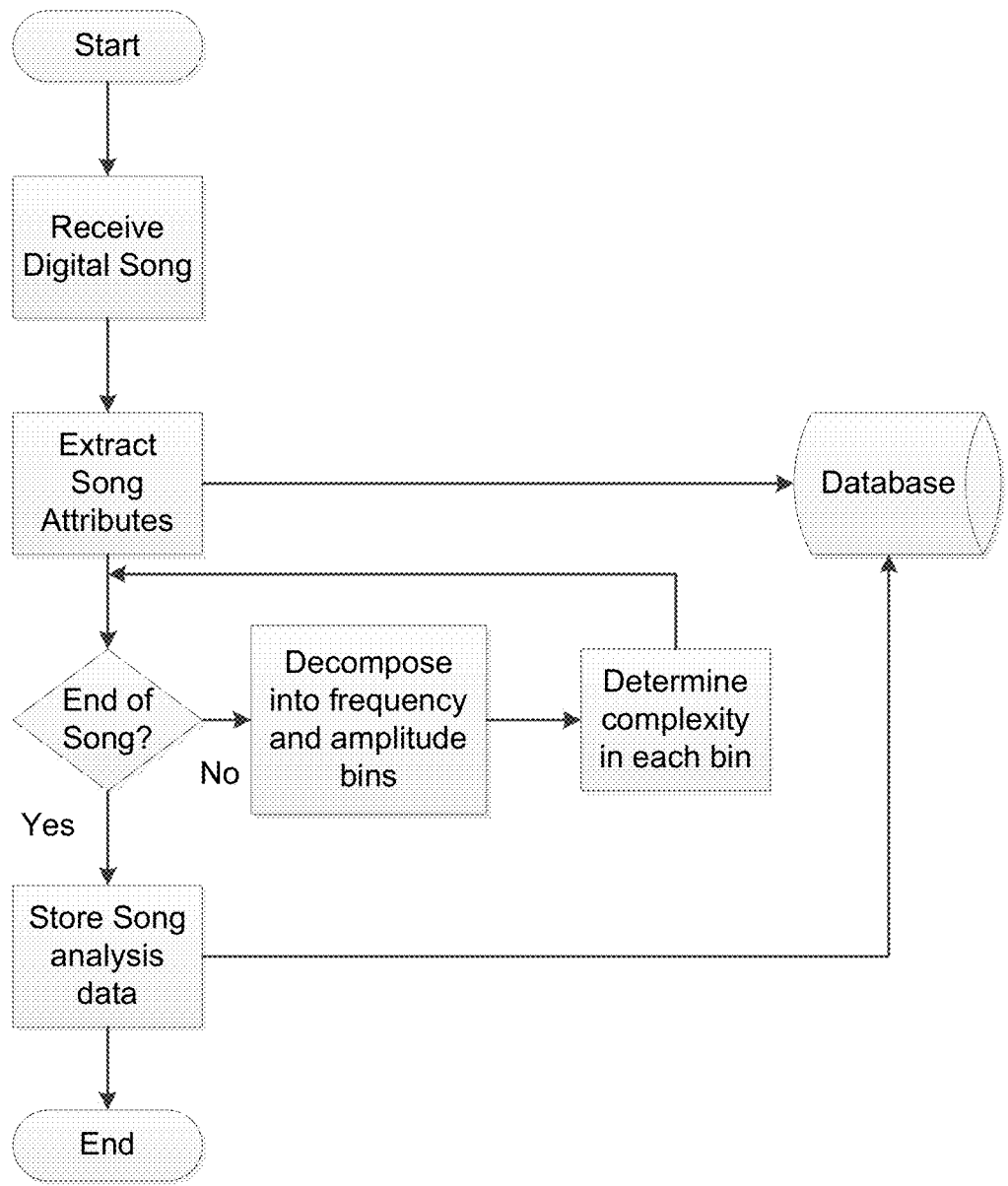
FIG. 4 shows a flow diagram showing how the method characterizes the various audio files.

FIG. 4 shows more detail of how a computer, memory, and corresponding software may analyze any given song into various frequency and amplitude bins, determine the bin complexity, and then score this bin complexity data for subsequent analysis.

Figure 5:
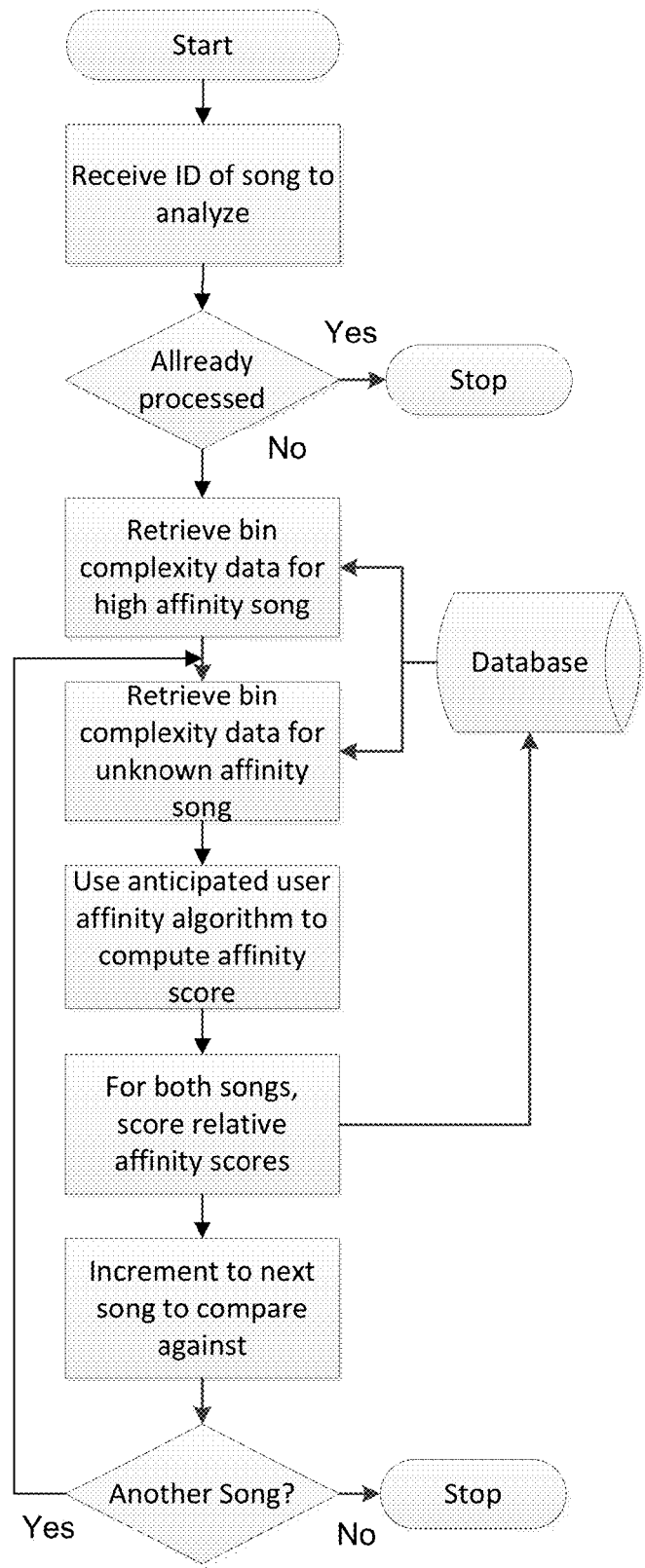
FIG. 5 shows a flow diagram of the process to compare various audio files stored in a database, such as a web server database and subsequently made available to users.

FIG. 5 shows how a plurality of different songs, many with unknown user affinity, can be automatically scored using at least one known song that the user likes (e.g. a high affinity song) as a comparison. In alternative embodiments, a plurality of songs that the user likes (e.g. a plurality of high affinity songs) can be used, a plurality of affinity scores generated for each unknown affinity song, and these plurality of user affinity scores then averaged, summed up, or otherwise analyzed to produce still more accurate user affinity results.

EXAMPLE

An audio file may be binned by frequency and amplitude according to various schemes. Each frequency bin, for example, may be on the order of 100 Hz (or less) wide for a fine binning process, or may be on the order 1000 Hz wide (or greater) for a coarse binning process. The bin distribution does not have to be even as a function of frequency, but instead can, for example, have more bins at the lower audio frequencies or human singing frequencies, and fewer bins at the higher audio frequencies.

Similarly for amplitude binning, each amplitude bin may be, for example, on the order of a decibel wide (in equivalent audio file units), or on the order of 10 decibels or more wide, depending on the amplitude granularity desired.

In some embodiments, after the initial frequency and amplitude binning has been done, and a complexity score for each bin determined, the bins may be further sub-binned by complexity as well, thus producing a 3D space arrangement of frequency, amplitude, and complexity bins for each audio file.

Figure 6:
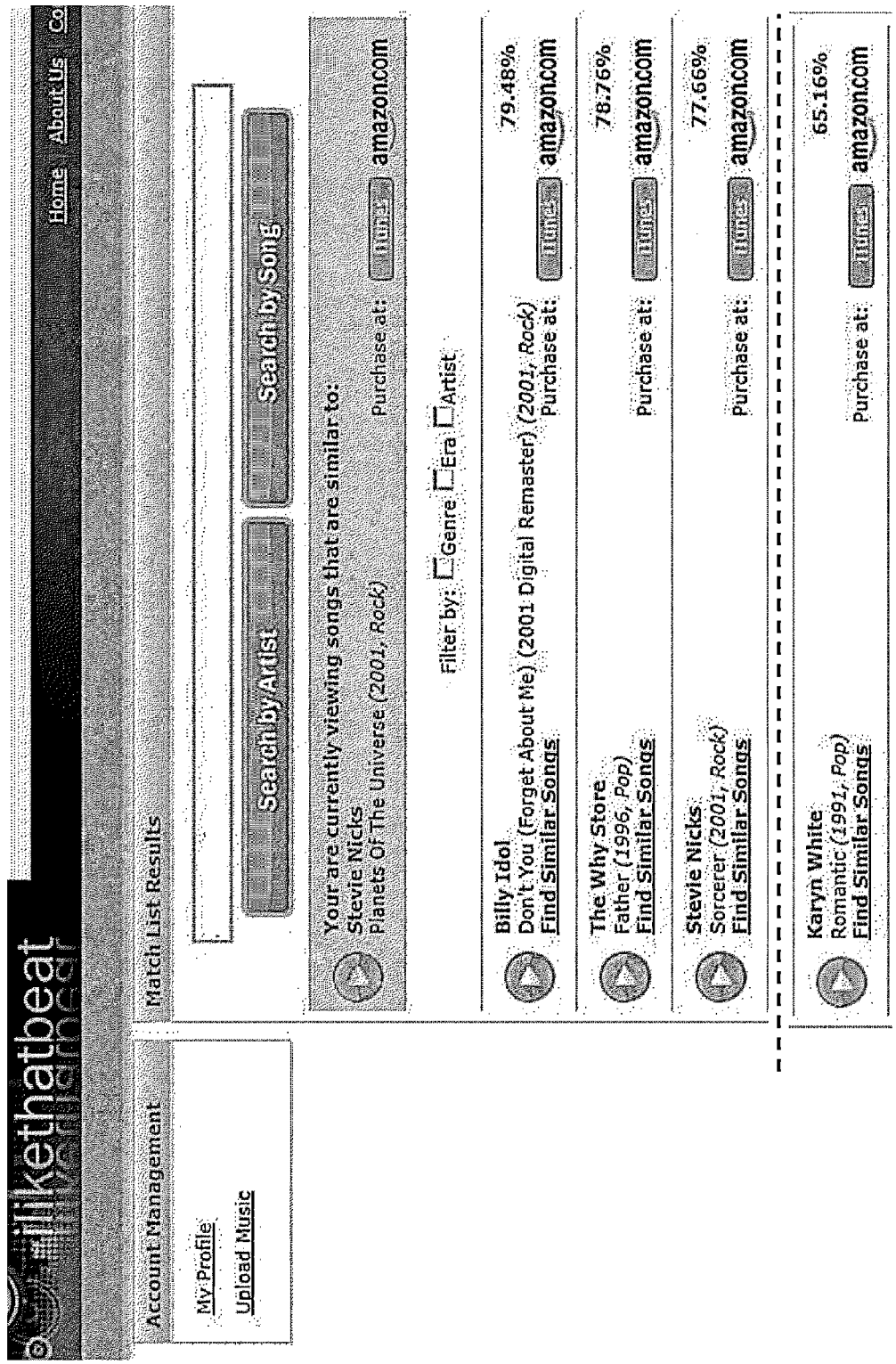
FIG. 6 shows a screenshot from a website using a web server that utilizes the invention's methods to first accept a high affinity user audio file name from the user, and in turn suggest other songs, along with their affinity scores, which the user might like to sample or purchase.

FIG. 6 shows the method being used on a website (ilikethatbeat.com) that allows a user to indicate a song that the user likes. Here the remote Internet user has used his or her web browser or other software application to access the server, enter in a song that the user likes, and request that the system suggest other songs that the user might like. Other methods to indicate liking (e.g. clicking on a selection, uploading a liked song file, etc.) may also be sued.

In FIG. 6, the system has scanned a variety of songs (here available on the Amazon online store for purchase), and has suggested various similar songs based on their relative user affinity score. It has then displaying the results back on the user's web browser. A screenshot of the user's web browser at this stage is shown.

Here, for example, the user likes the song, "Planets of the Universe" by Stevie Nicks. The system has performed the user affinity analysis. In addition to the not too surprising fact that the system has flagged another Stevie Nicks song from the same era, "Sorcerer" as being potentially also of interest to the user, the system has also flagged two more unexpected songs, "Don't You (Forget About Me)" sung by Billy Idol and "Father" by "The Why Store" as having an overall similar characteristics as the liked Stevie Nicks song. By contrast, other songs in the database, such as "Romantic" by Karyn White", have received lower scores.

Although evaluation of the results of this system has, of course, a somewhat subjective component, certainly fans of Steve Nicks "Planets" song might be well pleased with the "Sorcerer" song, and might be pleasantly surprised at their overall liking of the other highly ranked songs as well.

Thus, in this example, the system is using the anticipated user affinity algorithm to produce an anticipated user affinity score that is displayed on the display screen of a computerized device (here a web browser). This in turn allows the user to use the computerized system to understand that the otherwise perhaps unfamiliar or unknown songs by Billy Idol and The Why Store have received high affinity scores relative to the Stevie Nicks song that the user has indicated that they like (high affinity audio file).

In the examples shown in FIG. 6 above, binning was by frequency "f", amplitude "a", and also by complexity (here expressed as a distance function "d"). The frequency, amplitude and complexity distribution was chosen so that for a typical song, the bin distribution in the (f, a, d) space was optimized to give a roughly uniform result for each bin.

In this scheme, $\langle d \rangle$ is the mean distance (e.g. length, complexity value) for given f- and a-ranges and $\lfloor . \rfloor$ is a "floor" function (e.g. an example of a floor function is: $\lfloor 2.99 \rfloor = 2$).

The bins were chosen so that the complexity distribution in the (f, a, d) space for all the songs are closest to a uniform distribution in each bin, where the bin is defined as:

$$f_{min}^i < f \leq f_{max}^i, a_{min}^j < a \leq a_{max}^j, \text{and } d_{min}^k < d \leq d_{max}^k.$$

Here the anticipated user affinity algorithm, which produced an anticipated user affinity score "S", reported on FIG. 6, was as follows $$S = \frac{\sum_{i,j,k} \min(N_{i,j,k}^1, N_{i,j,k}^2)}{\sum_{i,j,k} \max(N_{i,j,k}^1, N_{i,j,k}^2)}.$$

Here $N_{i,j,k}^1$ the complexity score (here "d" score) for each frequency i, amplitude j, and complexity k bin of the high affinity audio file (song that the user likes), and $N_{i,j,k}^2$ is the corresponding complexity score (again "d" score) for each corresponding frequency i, amplitude j, and complexity k bin of the unknown affinity audio file (song that is being rated) song.

As previously discussed, other algorithms may also be used. Here the most important criteria is to bin the audio files by at least frequency and amplitude for a significant duration of the song playing time, determine the complexity of the audio signal in each bin, and then use one or more algorithms to compare a known liked song with an unknown song on a per-bin basis, and aggregate the results over the plurality of bins.

The invention claimed is:

1. A computerized method of comparing audio files according to anticipated user affinity, each said audio files having a nominal playing time duration, and each said audio file comprising at least one audio track that is itself composed of a summation function of a plurality of constituent audio waveforms with each constituent audio waveform having at least its own frequency, and amplitude, said method comprising:

For each audio file, for at least a substantial portion of said audio file that corresponds to a substantial portion of said audio file's nominal playing time duration, using at least one processor and memory to perform the steps of:

dividing the constituent waveforms of said at least one audio track into a plurality of frequency and amplitude bins, and analyzing the complexity of the constituent waveforms in each bin according to a complexity algorithm that produces a complexity score for each said bin, thus characterizing each audio file as a plurality of audio file frequency and amplitude bins, each bin having its own complexity score;

further producing at least one user affinity score between at least a first high affinity audio file with known high user affinity, and a different unknown affinity audio file with unknown user affinity, by the steps of:

for at least a substantial portion of all said high affinity audio file bins and said unknown affinity audio file bins, selecting matching bins with corresponding frequency and amplitude, and comparing the complexity scores of said matching high affinity audio file bins and said matching unknown affinity audio file bins according to an anticipated user affinity algorithm, thus producing an anticipated user affinity score for said unknown affinity audio file, thus allowing said unknown affinity audio file to be compared according to anticipated user affinity.

2. The method of claim 1, wherein the plurality of frequency and amplitude bins are chosen to at least roughly distribute at least one audio characteristic or audio characteristic function evenly between said bins.

3. The method of claim 1, wherein, for each bin, said complexity algorithm determines the complexity of the constituent waveforms in said bin by at least approximately determining the length of the value of said at least one audio track as a function of frequency in said bin over said bin frequency range.

4. The method of claim 3, wherein for each bin, said complexity algorithm operates on only the positive or absolute value of the amplitude portions of the sum of said constituent waveforms in said bin.

5. The method of claim 1, wherein for each bin, said complexity algorithm computes the information content encoded in the sum of the constituent waveforms in said bin.

6. The method of claim 1, wherein for each set of matching bins, said anticipated user affinity algorithm determines either which set of matching bins has a lowest complexity score, which set of matching bins has a highest complexity score, or the difference in the complexity scores between said matching bins, and then subsequently sums any of said results over at least the substantial portion of all bins.

7. The method of claim 1, further sub-binning said bins according to their complexity score, thus further characterizing each audio file as a plurality of audio file frequency, amplitude, and complexity bins, each with its own complexity score.

8. The method of claim 7, wherein for each set of matching bins, said anticipated user affinity algorithm determines either which set of matching bins has a lowest complexity score, which set of matching bins has a highest complexity score, or the difference in the complexity scores between said matching bins, and then subsequently sums any of said results over at least the substantial portion of all bins.

9. The method of claim 1, used to rank a plurality of audio files in a computer database, thus allowing a user of said database to use indicia of at least one high affinity audio file as a database query, and wherein said database uses said method to return indicia to said user of at least one unknown affinity audio file that may be potentially acceptable to said user, or transmit or play at least one unknown affinity audio file to said user or said user's computerized device.

10. The method of claim 1, wherein said anticipated user affinity algorithm produces an anticipated user affinity score that is displayed on the display screen of a computerized device, and that allows a user of said computerized device to understand that said unknown high affinity audio file is being favorably compared with said high affinity audio file.

11. The method of claim 1, wherein the time duration of each bin is at least a substantial fraction of the time duration of the audio file when played at said audio file's normal playback speed.

12. The method of claim 11, wherein the time duration of each bin is greater than 10% of the time duration of the audio file, but less than 33% of the time duration of the audio file, and the bins near either the beginning or end of said audio file are given a higher weight in said anticipated user affinity algorithm relative to the bins near the middle of said audio file.

13. A computerized method of comparing audio files according to anticipated user affinity, each said audio files having a nominal playing time duration, and each said audio file comprising at least one audio track that is itself composed of a summation function of a plurality of constituent audio waveforms with each constituent audio waveform having at least its own frequency, and amplitude, said method comprising:

For each audio file, for at least a substantial portion of said audio file that corresponds to a substantial portion of said audio file's nominal playing time duration, using at least one processor and memory to perform the steps of:

dividing the constituent waveforms of said at least one audio track into a plurality of frequency and amplitude bins, and analyzing the complexity of the constituent waveforms in each bin according to a complexity algorithm that produces a complexity score for each said bin, thus characterizing each audio file as a plurality of audio file frequency and amplitude bins, each bin having its own complexity score;

further producing at least one user affinity score between at least a first high affinity audio file with known high user affinity, and a different unknown affinity audio file with unknown user affinity, by the steps of:

for at least a substantial portion of all said high affinity audio file bins and said unknown affinity audio file bins, selecting matching bins with corresponding frequency and amplitude, and comparing the complexity scores of said matching high affinity audio file bins and said matching unknown affinity audio file bins according to an anticipated user affinity algorithm, thus producing an anticipated user affinity score for said unknown affinity audio file, thus allowing said unknown affinity audio file to be compared according to anticipated user affinity;

wherein said method is used to rank a plurality of audio files in a computer database, thus allowing a user of said database to use indicia of at least one high affinity audio file as a database query, and wherein said database uses said method to return indicia to said user of at least one unknown affinity audio file that may be potentially acceptable to said user, or transmit or play at least one unknown affinity audio file to said user or said user's computerized device; and wherein said anticipated user affinity algorithm produces an anticipated user affinity score that is displayed on the display screen of a computerized device, and that allows a user of said computerized device to understand that said unknown high affinity audio file is being favorably compared with said high affinity audio file.

14. The method of claim 13, wherein the plurality of frequency and amplitude bins are chosen to at least roughly distribute at least one audio characteristic or audio characteristic function evenly between said bins.

15. The method of claim 13, wherein, for each bin, said complexity algorithm determines the complexity of the constituent waveforms in said bin by at least approximately determining the length of the value of said at least one audio track as a function of frequency in said bin over said bin frequency range.

16. The method of claim 15, wherein for each bin, said complexity algorithm operates on only the positive or absolute value of the amplitude portions of the sum of said constituent waveforms in said bin.

17. The method of claim 13, wherein for each bin, said complexity algorithm computes the information content encoded in the sum of the constituent waveforms in said bin.

18. The method of claim 13, wherein for each set of matching bins, said anticipated user affinity algorithm determines either which set of matching bins has a lowest complexity score, which set of matching bins has a highest complexity score, or the difference in the complexity scores between said matching bins, and then subsequently sums any of said results over at least the substantial portion of all bins.

19. The method of claim 13, further sub-binning said bins according to their complexity score, thus further characterizing each audio file as a plurality of audio file frequency, amplitude, and complexity bins, each with its own complexity score; and wherein for each set of matching bins, said anticipated user affinity algorithm determines either which set of matching bins has a lowest complexity score, which set of matching bins has a highest complexity score, or the difference in the complexity scores between said matching bins, and then subsequently sums any of said results over at least the substantial portion of all bins.

20. The method of claim 13, wherein the time duration of each bin is at least a substantial fraction of the time duration of the audio file when played at said audio file's normal playback speed; and wherein the time duration of each bin is greater than 10% of the time duration of the audio file, but less than 33% of the time duration of the audio file, and the bins near either the beginning or end of said audio file are given a higher weight in said anticipated user affinity algorithm relative to the bins near the middle of said audio file.

* * * * *